(12) United States Patent
Chuang

(10) Patent No.: US 6,914,594 B2
(45) Date of Patent: Jul. 5, 2005

(54) PERSONAL DIGITAL ASSISTANT WITH A REPLACEABLE PERIPHERAL MODULE AT ONE OF ITS CORNERS

(75) Inventor: Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 397 days.

(21) Appl. No.: 10/063,773

(22) Filed: May 11, 2002

(65) Prior Publication Data

US 2003/0137493 A1 Jul. 24, 2003

(30) Foreign Application Priority Data

Jan. 18, 2002 (TW) ...................................... 91200428 U

(51) Int. Cl.[7] .............................................. G09G 5/00
(52) U.S. Cl. ..................... 345/169; 345/905; 455/556.2
(58) Field of Search ................ 345/156, 169, 345/173, 905; 348/14–15, 151, 207.99, 76, 207, 231; 455/550.1, 556.1, 556.2, 66, 90, 550, 556, 566; 361/683, 686; 710/303; 712/1

(56) References Cited

U.S. PATENT DOCUMENTS 6,146,210 A * 11/2000 Cha et al. ................... 439/680
6,256,063 B1 * 7/2001 Saito et al. ............. 348/231.99
6,424,369 B1 * 7/2002 Adair et al. ................... 348/76
6,657,654 B2 * 12/2003 Narayanaswami ....... 348/14.04
2002/0178343 A1 * 11/2002 Tsai et al. ........................ 712/1
2002/0193141 A1 * 12/2002 Wu ............................. 455/556
2004/0121801 A1 * 6/2004 Tom ......................... 455/556.1
2004/0192387 A1 * 9/2004 Liou .......................... 455/558
2005/0028325 A1 * 2/2005 Carnevali ..................... 24/3.7

* cited by examiner

*Primary Examiner*—Amare Mengistu
(74) *Attorney, Agent, or Firm*—Winston Hsu

(57) ABSTRACT

A rectangular personal digital assistant (PDA) includes a rectangular housing having a front side facing towards users and four corners, a computer circuit installed in the housing for providing data processing services, a socket installed in one of the four corners and electrically connected to the computer circuit, and a peripheral module having a case and an input/output peripheral circuit removably and electrically connected to the socket. When the peripheral module is installed in the socket, the case of the peripheral module coupled to the corner of the PDA housing will form an integrated corner of the PDA housing.

14 Claims, 3 Drawing Sheets

PERSONAL DIGITAL ASSISTANT WITH A REPLACEABLE PERIPHERAL MODULE AT ONE OF ITS CORNERS

BACKGROUND OF INVENTION

1. Field of the Invention

The present invention relates to a personal digital assistant (PDA), and more particularly, to a PDA with a replaceable peripheral module at one of its corners.

2. Description of the Prior Art

In our modern information based society, the personal digital assistant (PDA) has become a requirement for most businessmen and people in the high technology field. Because the PDA has a vastly decreased size and power, many devices present in notebook computers are often omitted in embedded equipment of the PDA, causing the functionality of the PDA to be insufficient and inconvenient.

An add-on card with special functionality is a card that contains electronic devices and is inserted into an expansion slot formed in the PDA in order to improve its functionality. Recently, a common compact-flash (CF) card has been one of the add-on cardsused for improving the PDAs performance.

Please refer to FIG. 1, which is a schematic diagram of a prior art PDA 10 and an expansion slot 22. The PDA 10 includes a rectangular housing 14 having a touch screen 16 and a plurality of buttons 18 formed on the PDA 10. Users can touch the touch screen 16 and the buttons 18 to operate the PDA 10, and then the touch panel 16 displays pictures and characters to let the users read the pictures and characters. In order to hold an add-on card 12, the PDA 10 includes an insert opening 20 having the expansion slot 22 located in the insert opening 20. The add-on card 12 is covered with a rectangular case 24 having an opening 26 formed on a side of the rectangular case 24 and an interface connector (not shown in FIG. 1) corresponding to the expansion slot 22 located in the opening 26. When the add-on card 12 is inserted into the insert opening 20 of the PDA 10, the interface connector will be connected to the expansion slot 22, so that the add-on card 12 is connected to the PDA 10 for enhancing the PDAs functionality.

However, because the power supplied from the standard expansion slot of the CF card is limited, it limits the add-on cards functionality. In actual conditions, the highest current supplied from the standard expansion slot of the PDA is about 550 milliamperes (1 milliampere=⅟1000 ampere). If the add-on card needs more current to operate normally than the specification of the standard expansion slot of the PDA provides, the PDA cannot utilize this add-on card to improve its functionality. For example, a desired transient current of a radio frequency (RF) circuit for transmitting or receiving the RF signal operating in wireless communication is about 2000 milliamperes. Therefore, the RF circuit cannot be located in the add-on card due to the insufficient current of the slot, and the PDA cannot be improved in the field of the wireless communication by using the standard expansion slot of the CF card.

Further, the PDA usually has only one expansion socket due to the small size of the PDA. When the user wishes to operate multiple functions of the PDA simultaneously, it is inconvenient while using the PDA. For example, the embedded memory of the PDA contains 32 MB static random access memory (SRAM) and 16 MB flash memory in general. When the user utilizes a digital camera card to film images and process the images, the digital camera card has to be connected to the PDA to input the images. However, when occupied memory of the images become too large and the embedded memory of the PDA is insufficient, the memory of the PDA has to be expanded to satisfy the operation. That is, a memory card has to be inserted into the expansion slot of the PDA. However, the expansion slot already contains the digital camera card. Therefore, the images or information stored in the digital camera card has to be transferred via the PDA to an extra computer first, and then the images are processed and outputted by using the memory of the extra computer. However, this procedure causes great inconvenience for the user who operates the PDA.

SUMMARY OF INVENTION

It is therefore a primary objective of the claimed invention to provide a PDA with a replaceable peripheral module at one of its corners to solve the above-mentioned problems.

According to the claimed invention, a personal digital assistant (PDA) includes a rectangular housing having four corner sand a front side facing towards a user, a computer circuit comprising a processor and a memory installed in the housing for providing data processing services, a touch screen installed on the front side of the housing and electrically connected to the computer circuit for receiving a signal inputted by the user and for displaying pictures, a socket installed at one of the four corners and electrically connected to the computer circuit, and a peripheral module comprising a case and an input/output (I/O) peripheral circuit removably and electrically connected to the socket. When the peripheral module is installed in the socket, the case of the peripheral module couples with the corner of the housing to form an integrated corner of the housing.

The PDA in the claimed invention includes the peripheral module positioned at one of its corners, which can be replaced with any peripheral module with special functionality according to the users demand. In addition, the PDA has the expansion socket to hold an add-on card to improve the performance of the PDA and increase convenience while operating the PDA.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
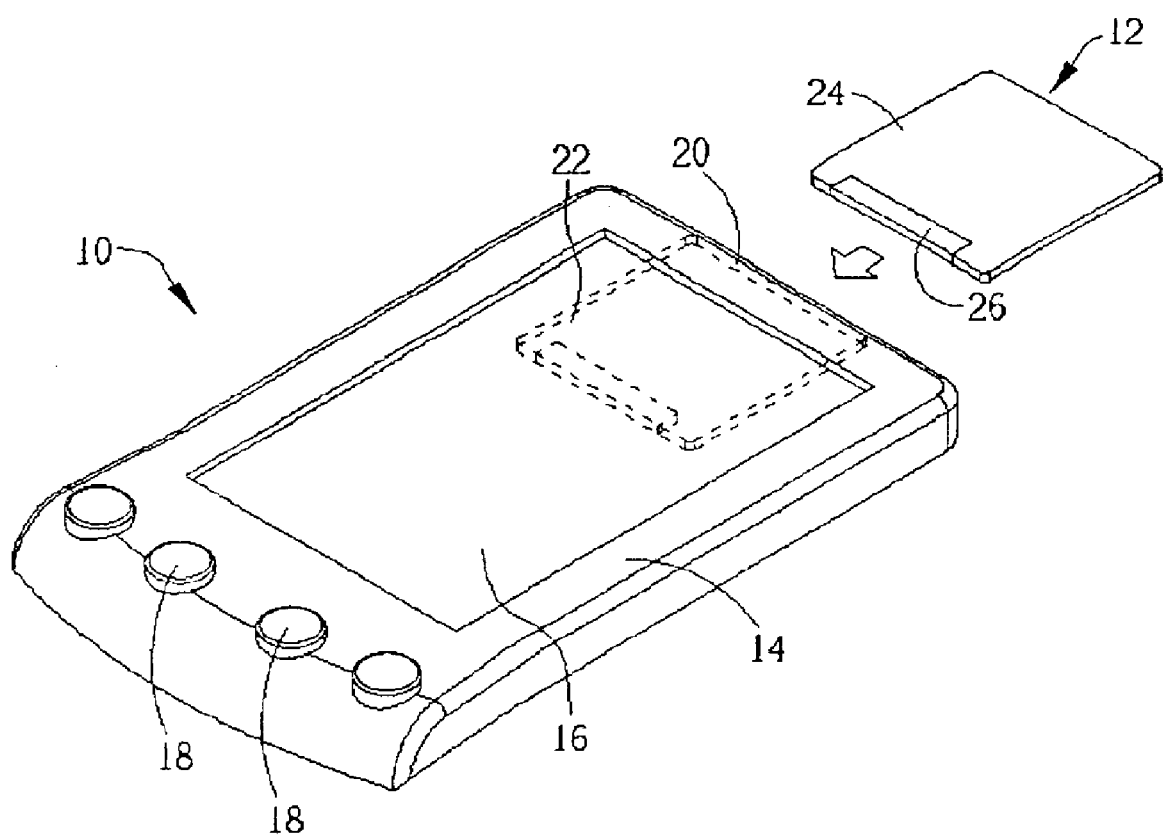
FIG. 1 is a schematic diagram of a prior art PDA and an expansion socket.
Figure 2:
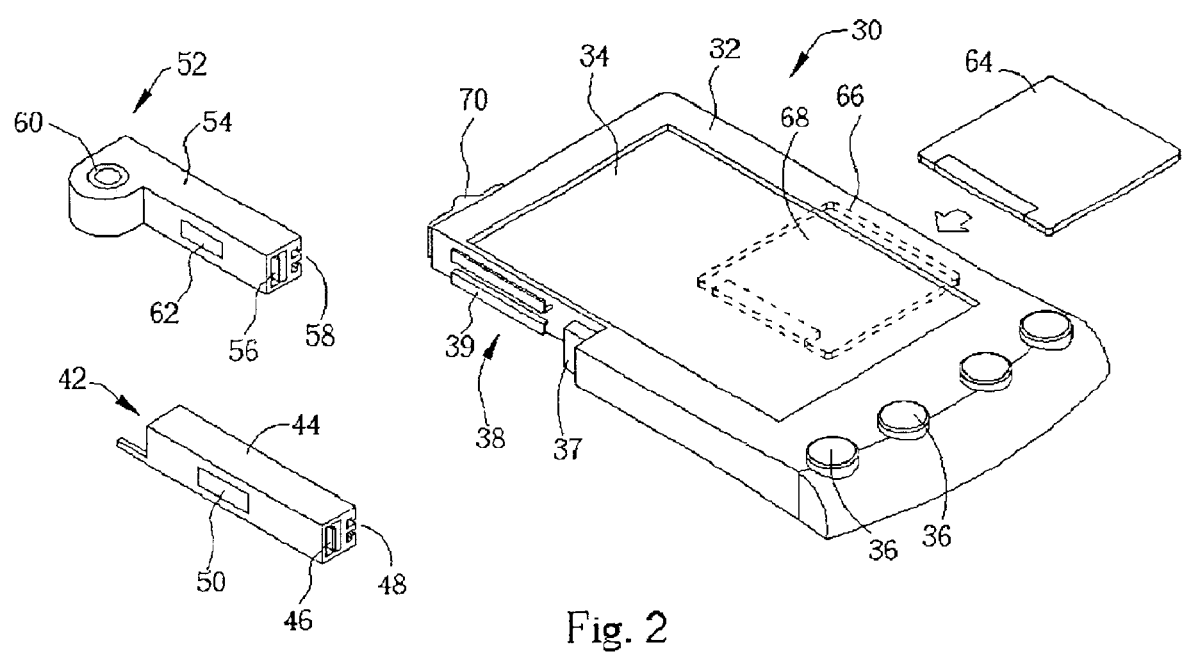
FIG. 2 is a schematic diagram of a PDA and replaceable peripheral modules according to the present invention.
Figure 3:
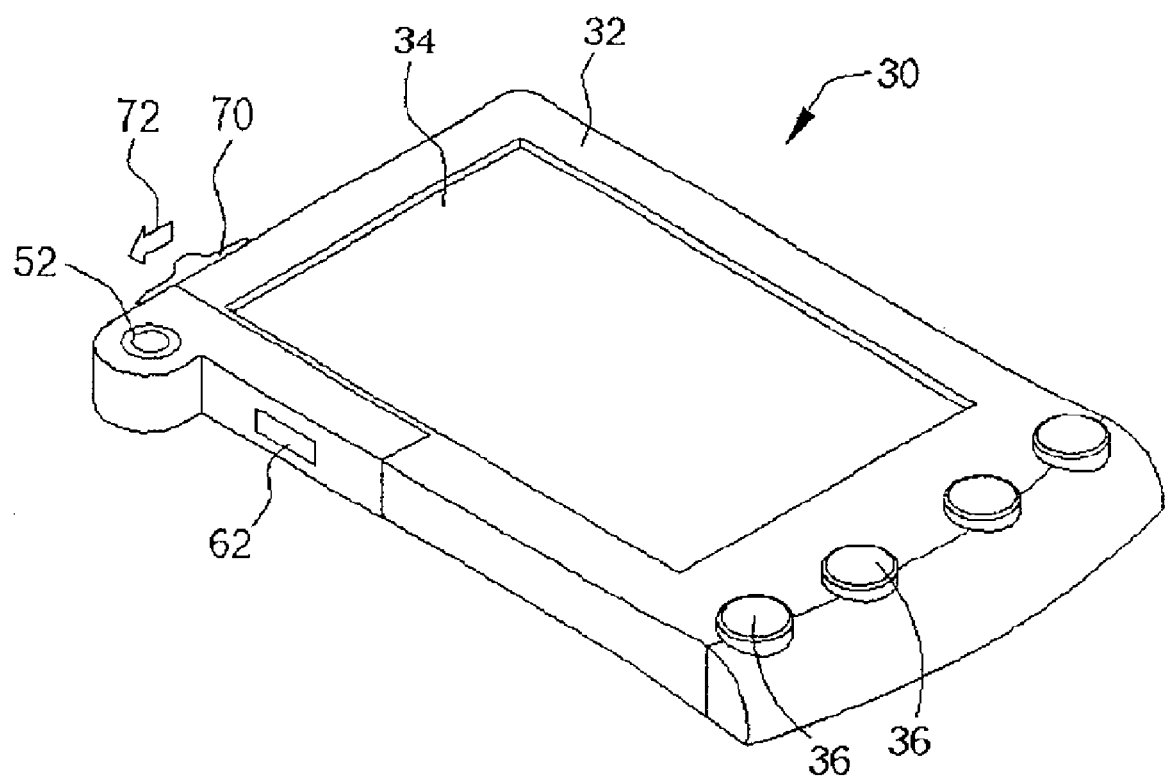
FIG. 3 is a schematic diagram of the PDA with one of the replaceable peripheral modules according to the present invention.

Please refer to FIG. 2 and FIG. 3. FIG. 2 is a schematic diagram of a PDA 30 and replaceable peripheral modules 42, 52 according to the present invention. FIG. 3 is a schematic diagram of the PDA 30 with the replaceable peripheral module 52 according to the present invention. The PDA 30 includes a rectangular housing 32 having four corners and a front side facing a user, a computer circuit (not shown in FIG. 2 and FIG. 3) installed in the housing 32 for providing data processing services, a touch screen 34 and a plurality of buttons 36 installed on the front side of the housing 32 and electrically connected to the computer circuit, a socket 38 installed at one of the four corners of the housing 32, such as a left corner of an upper side, and electrically connected to the computer circuit, one of the peripheral modules 42 or 52 removably and electrically connected to the socket 38. The users can touch the touch screen 34 and the buttons 36 to operate the PDA 30. The socket 38 includes a plug 37 and two slip tracks 39. The peripheral module 42 includes an edge connector 46 corresponding to the plug 37 and two slip troughs 48 corresponding to the two slip tracks 39. The peripheral module 52 includes an edge connector 56 corresponding to the plug 37 and two slip troughs 58 corresponding to the two slip tracks 39. The PDA 30 includes a locking device 70 formed on topside of the left corner of the upper side of the housing 32. When the slip troughs 48, 58 of the peripheral modules 42, 52 slip along the two slip tracks 39 so that the edge connectors 46, 56 are inserted into the plug 37, the locking device 70 is used to fix a backside of the peripheral modules 42, 52 to prevent the peripheral modules 42, 52 from falling off.

The computer circuit includes a memory, such as SRAM or flash memory for storing programs and data, and a processor electrically connected to the memory for providing data processing services. The computer circuit is used to control the PDA. The touch screen 34 is an LCD-based touch screen panel for displaying pictures and accepting input commands by the users using a touch pen or fingers. Resolution in dots per inch (dpi) of the touch screen 34 is normally 320×240 and is lower than a common monitor, which is 640×480 or more. In order to hold an add-on card 64 for improving the functionality of the PDA, the PDA 30 includes an insert opening 66 having an expansion slot 68 located in the insert opening 66.

The peripheral module 42 is a radio frequency (RF) module, and the peripheral module 52 is an image input module. The RF module 42 includes a rectangular case 44 and an RF circuit (not shown in FIG. 2 and FIG. 3) enclosed in the case 44, which is electrically connected to the edge connector 48 at its front end for transmitting or receiving a radio signal. When the user operates the PDA 30 with the RF module 42, the RF module 42 is inserted into the socket 38 of the PDA 30, so that the edge connector 46 is connected to the plug 37 and the case 44 of the RF module 42 couples with the left corner of the upper side of the housing 32 to form an integrated corner. After the RF module 42 is inserted into the socket 38, the user moves the locking device 70 of the PDA 30 towards left to hold the backside of the RF module 42 so as to fix the RF module 42 in the socket 38, as an arrow 72 shows in FIG. 3. At this time, the computer circuit of the PDA 30 can utilize the RF module 42 to receive and transfer the radio signal. In addition, the RF module 42 includes a control key 50 located on a left side of the case 44 that allows the user to control the PDA 30 with fingers. Since the control key 50 is disposed on the RF module 42, the control key 50 can have various types and numbers, such as a button or two rollers, according to the users demand.

The image input module 52 is used to sense an image in front of the PDA 30, i.e. take a picture. The image input module 52 includes a case 54, a camera lens 60, and an image sensor (not shown in FIG. 2 and FIG. 3) composed of a charge coupled device (CCD) for inputting the image into the computer circuit of the PDA 30. The installation procedure of the image input module 52 is the same as with the RF module 42, and is not repeated again.

In summary, the PDA of the present invention utilizes the replaceable peripheral module to improve the functionality of the PDA, and allow for easy upgrading of the PDA. The users can replace the peripheral module by themselves according to their demands, and the users can use the add-on card and the peripheral module simultaneously.

In contrast to the prior art PDA, the PDA of the present invention not only has the expansion slot, but also has the replaceable peripheral module disposed on the corner of the rectangular housing, so as to avoid the problem of insufficient current supplied from the expansion slot of the PDA. Furthermore, the expansion slot and the peripheral module can be used simultaneously to increase the functionality and convenience of the PDA.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A personal digital assistant (PDA) comprising:
   a housing comprising first and second approximately perpendicular sides partially circumventing two substantially rectangular faces;
   a touch screen installed on one of the faces;
   an approximately L-sbaped socket installed in the first side, the shorter portion of the L-shaped socket comprising a plug, the longer portion of the L-shaped socket comprising two slip tracks and extending from the shorter portion to the second side; and
   a locking device formed on the second side capable of being moved to extend away from the housing such that the L-shaped socket transforms into a substantially C-shaped socket.

2. The personal digital assistant of claim 1 further comprising a peripheral module having an edge connector removably connected to the plug of the socket.

3. The personal digital assistant of claim 2 wherein the peripheral module further comprises two slip troughs corresponding to and engaged with the two slip tracks.

4. The personal digital assistant of claim 3 wherein when the locking device is moved to extend away from the housing, the locking device fixes the peripheral module in the socket.

5. The personal digital assistant of claim 4 wherein the peripheral module is an image input module.

6. The personal digital assistant of claim 5 wherein the image input module comprises a camera lens and an image sensor, and the image sensor comprises a charge coupled device (CCD).

7. The personal digital assistant of claim 4 wherein the peripheral module is a radio frequency (RF) module.

8. The personal digital assistant of claim 7 wherein the radio frequency module comprises a control key that allows control of the personal digital assistant.

9. The personal digital assistant of claim 8 wherein the control key comprises rollers.

10. A personal digital assistant (PDA) comprising:
    a housing comprising a first and second approximately perpendicular sides;
    an approximately L-shaped socket installed in the first side, the shorter portion of the L-shaped socket comprising a plug, the longer portion of the L-shaped socket comprising two slip tracks and extending from the shorter portion to the second side;
    a removable peripheral module having an edge connector removably connected to the plug of the socket and two slip troughs engaged with the two slip tracks; and a movable locking device formed on the second side capable of being moved to extend away from the housing to fix the peripheral module in the socket.

11. The personal digital assistant of claim 10 wherein the peripheral module is an image input module.

12. The personal digital assistant of claim 11 wherein the image input module comprises a camera lens and an image sensor, and the image sensor comprises a charge coupled device (CCD).

13. The personal digital assistant of claim 10 wherein the peripheral module is a radio frequency (RF) module.

14. The personal digital assistant of claim 13 wherein the radio frequency module comprises a control key having buttons and/or rollers that allows control of the personal digital assistant.

\* \* \* \* \*